US007919909B2

(12) United States Patent  
Sabah et al.

(10) Patent No.: US 7,919,909 B2  
(45) Date of Patent: Apr. 5, 2011

(54) INTEGRATED COUPLING STRUCTURES

(75) Inventors: Sabah Sabah, Nashua, NH (US);
Jeffrey C Andle, Falmouth, ME (US);
Daniel S Stevens, Stratham, NH (US)

(73) Assignee: Delaware Capital Formation, Inc., Wilmington, DE (US)

(*) Notice: Subject to any disclaimer, the term of this patent is extended or adjusted under 35 U.S.C. 154(b) by 182 days.

(21) Appl. No.: 12/429,300

(22) Filed: Apr. 24, 2009

(65) Prior Publication Data
US 2010/0271152 A1    Oct. 28, 2010

(51) Int. Cl.
*H01L 41/053* (2006.01)
*H01L 41/00* (2006.01)
*H02N 2/00* (2006.01)
(52) U.S. Cl. .................. 310/348; 310/26; 310/309
(58) Field of Classification Search .............. 310/26, 310/309, 348
See application file for complete search history.

(56) References Cited

U.S. PATENT DOCUMENTS

| 2006/0022767 A1* | 2/2006 | Taniguchi et al. ............ 333/133 |
| 2007/0051176 A1 | 3/2007 | Liu |
| 2008/0030353 A1* | 2/2008 | O'Toole et al. ............... 340/584 |
| 2008/0186205 A1* | 8/2008 | Breed ............................. 340/901 |
| 2009/0008753 A1* | 1/2009 | Rofougaran .................. 257/660 |
| 2009/0028001 A1 | 1/2009 | Andle et al. |
| 2010/0066209 A1* | 3/2010 | Saitou et al. .................. 310/340 |

OTHER PUBLICATIONS

Zhang, Y.P. et al., "Novel Antenna-in-Package Design in LTCC for Single-Chip RF Transceivers", IEEE Transactions on Antennas and Propagation, Jul. 2008, pp. 2079-2088, vol. 56, No. 7.
Zhang, Y.P., "Integrated-Circuit-Pressed Ceramic-Package Antenna", Microwave and Optical Technology Letters, Jul. 20, 2004, pp. 143-147, vol. 42, No. 2.
Barie, Nicole et al., "Fast SAW Based Sensor System for Real-Time Analysis of Volatile Anesthetic Agents", IEEE, 2007, pp. 958-961.

* cited by examiner

*Primary Examiner* — Thomas M Dougherty
(74) *Attorney, Agent, or Firm* — Vern Maine & Associates

(57) ABSTRACT

An integrated package provides contactless communication through a coupling mechanism embedded in the package. Package types include Surface Mount Technology (SMT), Low Temperature Co-fired Ceramic (LTCC) technology, and dual-in-line integrated circuit pressed ceramic packages generally. The package can include an acoustic wave device (AWD) sensor such as a surface acoustic wave (SAW) device or a bulk acoustic wave (BAW) device. Coupling includes inductive and capacitive effects through plates, loops, spirals, and coils. Coil inductance and SAW capacitance can be parallel resonant at the desired SAW resonance with the coil impedance higher than the SAW impedance, minimizing load-pull effects.

46 Claims, 10 Drawing Sheets

600

INTEGRATED COUPLING STRUCTURES

FIELD OF THE INVENTION

The invention relates to wireless sensor packages with integrated coupling structures and, more particularly, embodiments including near-field wireless Acoustic Wave Devices (AWDs) inductively or capacitively coupled to a physically disconnected transceiver.

BACKGROUND OF THE INVENTION

Existing SAW devices have been used in a variety of fluid, physical and chemical sensors. Features of SAW sensors include an ability to operate without an external power-supply and an ability to be interrogated wirelessly. Wireless sensor communication systems involve multiple components including sensor, antenna and interconnections. These separate elements lead to added cost and complexity, fabrication difficulties and reliability issues.

Some Antenna-in-Package (AiP) devices are known as in "Novel Antenna-in-Package Design in LTCC for Single-Chip RF Transceivers", Zhang, Y. P.; Sun, M.; Lin, W.; Antennas and Propagation, IEEE Transactions, Volume 56, Issue 7, July 2008, Pages 2079-2088 and Y. P. Zhang, "Integrated-Circuit-Pressed Ceramic-Package Antenna", Microwave Opt. Technol. Lett. 42: 143-147, 2004. However, these are designs for antennas for radio communications requiring maximum range, far-field pattern uniformity and specific polarization. They are implemented in radio transceivers for communication applications such as those employing the IEEE standard 802.11a. These antennas transmit at 5.775 GHz and are matched to a 50 ohm source. For these applications, global optimizations are necessary resulting in particular design parameters. Achieving these objectives results in expensive, complex devices and does not address the need for close-coupled, passive-wireless sensors with little or no radiated power and similar applications.

Particular sensor devices have been disclosed comprising inductively coupled interrogation and sensor components such as the Liu Passive Hybrid LC/SAW/BAW Wireless Sensor patent application US 2007/0051176. The Liu application discusses sensors coupled to interrogation circuits by wires, radio transmission, and inductive coupling. It does not identify solutions with sensor packages that include integrated coupling and sensing components.

Capacitive coupling of AWD components internal to their packages have been described as in "Fast SAW Based Sensor System for Real-Time Analysis of Volatile Anesthetic Agents", Barie, N.; Voigt, A.; Rapp, M.; Marcoll, J., Sensors, 2007 IEEE, 28-31 Oct. 2007, pages: 958-961.

What is needed, therefore, are techniques for cost-effective, flexible, integrated-package wireless acoustic wave devices (AWDs) for near-field coupling to associated instrumentation.

SUMMARY OF THE INVENTION

Benefits of the invention include simple production, repeatable sensor performance, smaller size, enhanced reliability, reduced cost, easier installation, and greater environment immunity.

Embodiments include a system for wirelessly communicating data, the system comprising an acoustic wave device (AWD) sensor comprising an AWD; a sensor package containing the AWD, and at least one coupling structure integrated with the sensor package, wherein the at least one integrated coupling structure is embedded in the sensor package, operatively coupled to the AWD sensor and wherein the at least one integrated coupling structure reactively couples with coupling structure of an adjacent transceiver across a separation.

In some embodiments, the mutual coupling reactance is large compared to acoustic resistance of the AWD and resistance of the transceiver is large compared to the acoustic resistance, minimizing load perturbations of resonant frequency of the AWD. In another embodiment, the mutual coupling reactance is small compared to acoustic resistance of the AWD and resistance of the transceiver is large compared to the acoustic resistance, minimizing load perturbations of resonant frequency of the AWD. For other embodiments, the package provides mechanical and electromagnetic isolation for operation in hazardous environments. Embodiments include further comprising power dissipative elements providing electrostatic discharge (ESD) protection and series capacitive elements providing electrostatic discharge (ESD) protection. In yet other embodiments, the system operates between about approximately 200 MHz and about approximately 3 GHz. For some embodiments, at least one integrated coupling structure is at least one conductive region and the reactive coupling is capacitively-reactive coupling.

In other embodiments, the AWD further comprises an operative coupling to an equivalent RF ground and at least one conductive region comprises at least two conductive regions. For embodiments, the AWD comprises a one port resonator, the AWD comprises a one port reflective delay line, the AWD comprises a two port resonator, and the AWD comprises a reflective array compressor (RAC).

In further embodiments, the AWD comprises a device based on surface generated acoustic wave (SGAW) effects, and in another, the AWD comprises a device based on bulk generated acoustic wave (BGAW) effects. For some embodiments, the relationship of the position of the sensor with respect to the transceiver is stationary; in others, the relationship of the position of the sensor with respect to the transceiver comprises motion.

In an embodiment, the separation is less than the reactive near field distance. For other embodiments, the electrical length of the at least one coupling structure is smaller than about approximately $\lambda/10$. In yet other embodiments, the sensor package is ceramic and comprises a lid, wherein the lid comprises at least one coupling structure.

In still further embodiments, the at least one coupling structure comprises a region of the lid of the ceramic package, and the sensor package is ceramic and comprises a base, wherein the base comprises the at least one coupling structure. For some embodiments the at least one coupling structure comprises a region of the base of the ceramic package.

In embodiments, the at least one integrated coupling structure comprises at least one conductive path and the reactive coupling is inductively-reactive coupling. For further embodiments, the at least one conductive path is operatively connected to one pair of transducer connections of the AWD sensor, or the at least one conductive path comprises at least two integrated coupling structures operatively coupled to two pairs of transducer connections on the AWD. In included embodiments, the AWD comprises a one port resonator, a one port reflective delay line, a two port resonator, or a reflective array compressor (RAC).

In other embodiments, the conductive path comprises a planar, spiral inductor, or the conductive path comprises a solenoidal inductor comprising at least one loop around periphery of the sensor package, or the conductive path comprises a structure behaving as a lumped element inductor.

In some embodiments, the inductor is resonant with the natural input capacitance of the AWD, or the inductor is self-resonant, approximating a helical resonator. For yet other embodiments, the conductive path comprises a structure behaving as a transmission line having mutual impedance to the coupling structure in the transceiver.

In other embodiments, the AWD comprises a device based on surface generated acoustic wave (SGAW) effects, or the AWD comprises a device based on bulk generated acoustic wave (BGAW) effects.

For various embodiments, the separation is less than the reactive near field distance, the relationship of the position of the sensor with respect to the transceiver is stationary, or the relationship of the position of the sensor with respect to the transceiver comprises motion. For another embodiment, the electrical length of the at least one coupling structure is smaller than about approximately $\lambda/10$. In yet another, the sensor package is ceramic and comprises a base, wherein the at least one integrated coupling structure comprises a pattern embedded into the base of the ceramic package.

One other embodiment is a method for wirelessly sensing data comprising providing an acoustic wave device (AWD) sensor comprising an AWD; a sensor package containing the AWD, and at least one coupling structure integrated with the sensor package, wherein the integrated coupling structure is embedded in the sensor package, operatively coupled to the AWD sensor, and wherein the integrated coupling structure reactively couples with the coupling structure of an adjacent transceiver across a separation; and sensing the data from the AWD sensor.

Yet another further embodiment provides a system for wirelessly communicating data, the system comprising an acoustic wave device (AWD) sensor comprising an AWD; a ceramic sensor package containing the AWD, and at least one coupling structure integrated into the sensor package, wherein the integrated coupling structure is embedded in lid of the sensor package, operatively coupled to the AWD sensor, the electrical length of the coupling structure is smaller than about approximately $\lambda/16$, and wherein the integrated coupling structure capacitively-reactively couples with the coupling structure of an adjacent transceiver across a separation.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The invention provides sensor and data transmission capabilities in a single sensor package. A novel Surface Mount Technology (SMT) package with integrated coupling structures for use in near-field, close-coupled, wireless acoustic wave device AWD sensor applications is disclosed. The integrated sensor greatly reduces the size and cost of the transceiver and sensor antennas replacing antennae and mechanical coupling structures with a single package comprising the sensor and associated near field coupling structures. The cost and size of the AWD sensor is dramatically reduced by integrating the AWD sensor chip and the coupling structure within the same package. A reduction in size and the elimination of interconnects and feed lines reduces electromagnetic radiation, simplifying EMC/EMI compliance and reducing the demands of filtering in the transceiver circuit.

Coupling Types

Figure 7:
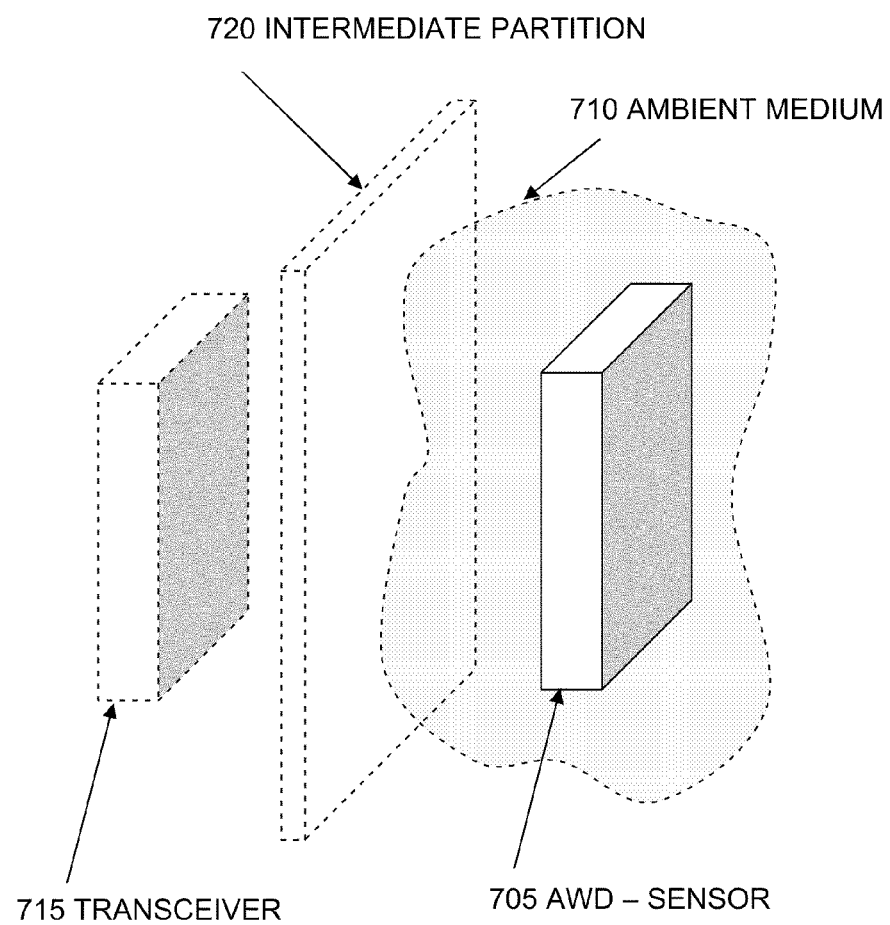
FIG. 7 is a simplified diagram of a wirelessly coupled integrated package sensor system configured in accordance with one embodiment of the present invention.

In addition to far-field propagating wave coupling, there exist near-field coupling applications for wireless sensors. In such systems the interrogating system and the passive sensor are not physically connected and are typically much closer than a wavelength. Coupling is accomplished through electrostatic or magnetostatic fields. This can be capacitive coupling between metal electrodes in proximity or inductive coupling between current carrying conductors. Coupling between electrical resonators such as helical resonators is also possible. Each of these approaches offers a solution to sensor applications where the relative location of the interrogation system and sensor are relatively constant and direct contact is not allowed. Applications include rotating equipment, translational transceiver-sensor motion, and hazardous locations including high voltage applications. Embodiments provide a mechanical and electromagnetic relationship of coupling across an isolation barrier to support operation in hazardous environments. FIG. 7 depicts one such embodiment. Motion is defined to include random and translational motion as well as rotational motion in one or more axes.

For at least some embodiments, the metal lid of the package housing the AWD sensor is used as the sensor coupling structure. A simple metal sheet (e.g. copper-foil) serves as the transceiver coupling structure. The metal sheet is independently provided or adhered to a printed circuit board or other insulating support. Single-ended signal coupling exists provided the sensor's second electrical connection is made to RF ground, either directly or capacitively. This is accomplished in the case of metal equipment and machinery but is also feasible in many other applications.

Read range separation between sensor and transceiver is up to about 70 to 100 mm for embodiments at frequencies of about 433 MHz. More generally, the coupling range is limited by the scale of the reactive near field, mathematically defined as $R=\lambda/2\pi$, where R is the radius of the reactive near field, and $\lambda$ is the wavelength in the coupling medium. In the 900 MHz industrial, scientific and medical (ISM) band, the coupling distances are <~50 mm and at 2.5 GHz, the coupling distances are on the order of 15-20 mm.

At increasing operating frequencies it becomes increasingly practical to employ weak radiative coupling between antennae since antennae dimensions scale inversely with frequency. It also becomes increasingly difficult to prevent radiation, eliminating at least one desired advantage of near field reactive coupling. Nonetheless there will exist micromachined and other precision applications wherein sufficiently small dimensions exist to allow the practice of the invention absent significant radiated electromagnetic energy.

The antennae at 2.5 GHz are sufficiently small to be integrated into the package and offer longer, radiative coupling. In comparison, at the lower frequencies associated with resonant AWD sensors, close coupling using the reactive near field is notably effective and offers integration previously restricted to high frequency sensors with radiative antennae while significantly reducing unwanted energy radiation.

In one such close coupling embodiment, plate capacitance establishes a contactless, single-ended link between the transceiver and sensor. In one embodiment, the sensor is physically connected to a conductor serving as an RF ground plane and is also connected to a coupling structure integrated into its package. The integrated coupling structure forms one plate of an air-gap, parallel plate capacitor in conjunction with a plate of a transceiver. Dielectrics other than air are contemplated and are especially useful in increasing the wavelength, thus the coupling distance, and in increasing the breakdown voltage of the isolation between transceiver and sensor.

For another embodiment, at least two sensor electrical contacts are brought to at least two independent coupling structures integrated into the package. The coupling structures form at least a pair of air-gap capacitors with associated coupling structures of a transceiver, offering balanced transmission with no requirement for a local RF ground plane. Non-parallel coupling structure embodiments are included.

Classification of Structure Dimensions

In addition to the reactive near field coupling distance defined above, it is also typical to define the reactive near field radius for electrically large structures and the radiative near field distance of a structure. It is generally assumed that electrically small structures do not radiate. Electrically small is not rigorously and uniformly defined in the literature. Therefore, the following guidelines are provided. Structures having electrical length larger than $\lambda/4$ are traditionally considered acceptable antennae and therefore an electrical dimension less than $\lambda/4$ can be considered as electrically small. A more stringent metric may be obtained by requiring the electrical dimension to be an order of magnitude smaller than the wavelength, which indicates dimensions less than $\lambda/10$ as another definition. One practical embodiment at 433 MHz employs a capacitive plate of width 0.55" and length 1.55", having a maximum dimension of 1.64" (0.042 m), which is slightly less than $\lambda/16$. An arbitrary limit on the sensor element dimensions of approximately 0.01 m will be assumed for illustrative purposes. The upper frequency for which said element is electrically small is 3 GHz in air. Smaller structures could be supported at upper levels. When immersed in a dielectric medium with a relative dielectric constant or relative static permittivity, $\in_r$, of 100, the frequency limit becomes 300 MHz.

Near Field Distances

Figure 10:
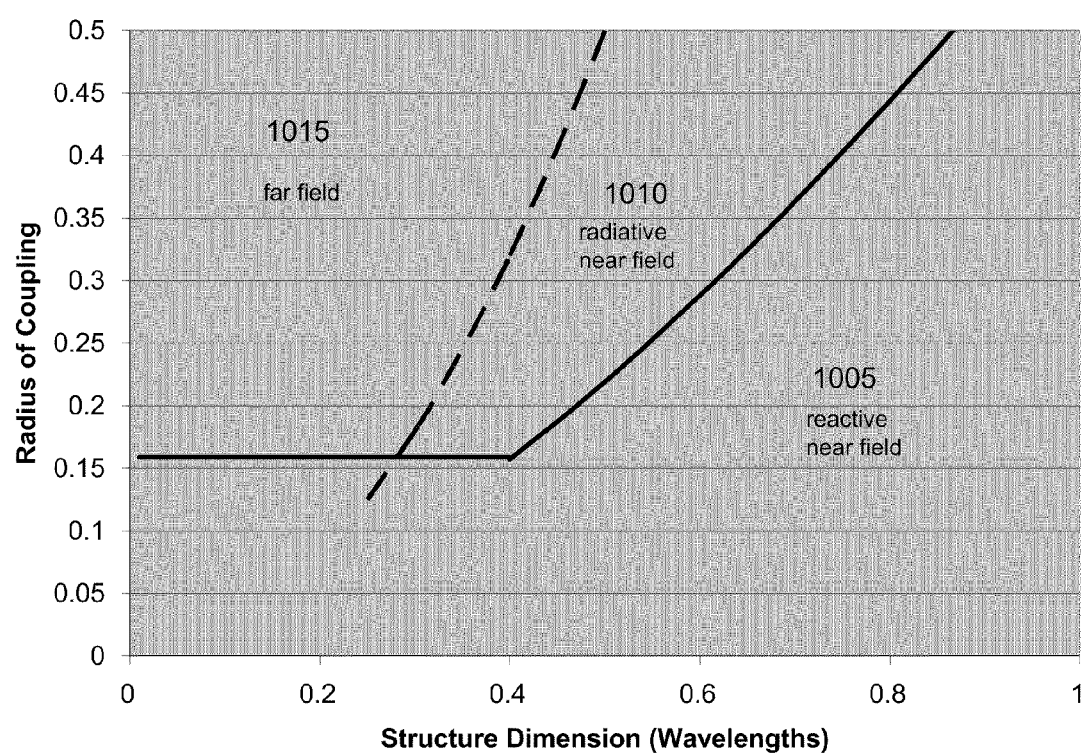
FIG. 10 is a graph illustrating the relative coupling radii of reactive near field, radiative near field and radiative far field coupling as a function of coupling structure size, normalized to the wavelength.

While coupling structure embodiments are typically not electrically large, it is instructive to consider the reactive near field distance and radiative near field distance as a function of normalized structure dimension. A structure smaller than ~0.67$\lambda$ has a reactive near field distance of an electrically small structure, obeying the electrically large limit, $R/\lambda \sim 0.62*(D/\lambda)^{3/2}$, for D>0.4$\lambda$. Where D is a nominal coupling structure dimension. Even immersed in a dielectric with an $\in_r$ of 100, this corresponds to a frequency of 1.2 GHz for a 1 cm structure. Another metric relates to the onset of radiative far field, $R/\lambda=2(D/\lambda)^2$, which exceeds the small element reactive near field distance only above $\lambda/4$, as seen in FIG. 10.

Near Field Coupling

Capacitively coupled circuit embodiments include pairs of plates, each much smaller than the wavelength. In the near field case, the plates form a lumped element capacitor. The current through the gap between the pair of plates is given by current, I=2$\pi$F C V, where F is frequency, C Is capacitance, V is voltage and where the coupling structure of parallel overlap area, A, and separation distances, d, in dielectric constant, $\in$, has the capacitance, C=$\in$A/d plus a fringing field term.

Inductively coupled circuit embodiments include pairs of current carrying wires, each electrically short compared to a wavelength. Each wire has a self inductance determined by its geometry. There exists a mutual inductance between the pairs of current carrying wires determined by the interaction of the magnetostatic lines of flux therebetween, providing coupling.

Since near field coupling provides significant electrical coupling between the transceiver and the coupled circuit, it is instructive to define several terms as they apply to the invention.

Load-pull effects refer to the effects of varying impedance as seen by the output of an active device to other than a matching 50 ohms. The following discussion applies to traditional AWD employing capacitive transducers on piezoelectric devices. The discussions can be equally applied to nonpiezoelectric AWD such as resonators using electrostatic drive, typified by capacitive micromachined ultrasonic transducer (C-MUT) devices and inductive coupling structures on nonpiezoelectric substrates employing Lorentz force excitation. Since the resonant AWD has at least some input reactance in parallel with the mechanical resonance determining a center frequency, it is expected that changing the reactance of the source/load circuit will alter the resonant conditions. Careful design of coupling structures and optional matching networks will mitigate this variability. Analysis of the change in resonant frequency with reactive and resistive loading indicates that the rate of change in frequency is minimized for high load impedances and high capacitive reactances. Loads with small reactance and low impedance have more significant effect on the resonant frequency of a typical AWD.

Self-resonance of an inductive element refers to a coil's parasitic capacitance having a parallel resonance with its inductance, causing the inductive element to exhibit a maximum of impedance at the self resonant frequency. At higher frequencies, stray capacitance becomes dominant and the impedance drops. At frequencies significantly above self-resonance the inductive coupling is shunted by said capacitance, reducing coupling efficiency. Precisely at parallel resonance, the structure becomes a helical resonator. At this frequency there is efficient coupling between two neighboring resonant inductive structures through their mutual impedance.

Mutual impedance between two coupling structures is described by $Z_{12}=v_2/i_1$ where $v_2$=the voltage present at coupling structure 2 to produce the current produced by coupling structure 1 and $i_1$=current flowing in coupling structure 1 (without voltage present at coupling structure 1). An analogous description of mutual admittance is also well known in the art, as are mathematical descriptions using voltage transfer, current transfer, hybrid parameters, and power scattering parameters for the two port network consisting of the electrical ports of the coupling structures.

Embodiments of the present invention offer a means of coupling a sensor to a circuit across an air gap, as might be applicable to the instrumentation of rotating equipment. A sensor or sensors having integrated coupling structures can be located on the rotating equipment and sensed as they pass through the coupling radius of the corresponding coupling structure. Analogous applications involve an instrumentation wand employed to detect and interrogate independently positioned sensors.

Another class of applications relates to the location of a plurality of sensors within a tank or vessel. Since the sensors are passive and powerless, they are inherently suited to the needs of intrinsic safety requirements for hazardous locations. The ability to monitor the sensors in a hazardous environment using electronics in an environment having a lower class of hazard is of significant commercial value. As mentioned, embodiments provide a mechanical relationship of coupling across an isolation barrier to support operation in hazardous environments.

The integration of the coupling structure into the package overcomes size, complexity, and installation limitations of prior art sensors and is applicable to a wide range of applications, sensor types and interrogation methods.

There exist nominally two distinct approaches to coupling a sensor to an interrogation system energy loss and energy storage. The simplest method employs only the loss of energy from the interrogation system into the resonant sensor. Liu gives one such example using a grid dip oscillator (GDO) inductively coupled to an inductance, L, capacitance, C, (LC), bulk acoustic wave (BAW) or SAW resonator. GDO and related systems such as Liu's that only operate on a loss of signal are not reliable and can provide false or imprecise measurements. They do not employ the energy storage properties of an acoustic wave device (AWD) and do not provide a positive assertion of a working sensor's presence.

Energy storage systems which employ throw/catch interrogation in which a pulse of energy is employed to interrogate the sensor and a return signal is analyzed are far superior in accuracy, precision, reliability and flexibility. These systems employ methods applied in radar systems but use the extraordinary energy storage times of the AWD to suppress multipath electromagnetic distortion.

In one sub-class of energy storage systems, a sinusoidal burst of limited spectral bandwidth is applied. The pulse is transferred to stored energy with a resonant AWD and is subsequently returned over a longer time span at a lower amplitude. Fourier transform methods are employed to obtain the resonant frequency of the associated sensor.

In another subclass of energy storage systems, a time-domain encoded signal is applied to the sensor and a time domain signal is returned based on reflective delay line methods. The return signal is then correlated to an expected response.

All three of these energy storage methods benefit from the availability of an improved integrated sensor afforded by the present invention. The integration of a coupling structure using reactive coupling to the interrogator overcomes size and shape limitations in numerous applications that have hindered the acceptance of passive wireless sensors.

Figure 1:
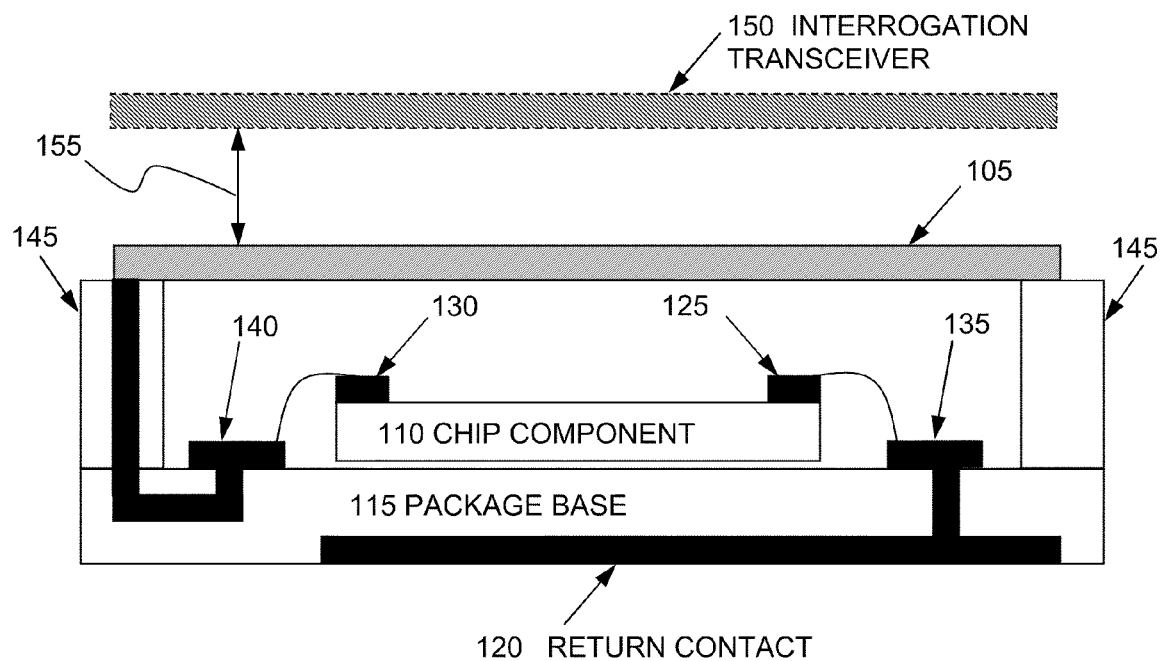
FIG. 1 is a simplified view of an integrated package cross-section configured in accordance with one embodiment of the present invention.

FIG. 1 is a cross-section of an embodiment using single ended reactive coupling to a chip component having signal return through a shared radio frequency (RF) ground. An integrated package 100 is illustrated having lid 105 comprising an integrated coupling component forming one side of a parallel plate capacitor. Chip component 110 may be an acoustic wave sensor or RFID, for example, and is either packaged with or comprises a region of package base 115. Integrated return contact 120 supports coupling of the RF return signal to the transceiver, for example, via a ground plane. Additional electrical connections to said chip 110 may also be patterned into the lower surface and may be employed for in-package testing or programming of said chip 110. Chip component 110 comprises bond pads 125 and 130 for connecting to the associated circuit. First bond pad 125 connects to bond pad 135 for first electrode return contact 120 on the bottom of the package. Second pad 130 connects to bond pad 140 and is internally connected with the package through sidewall 145 to the seal ring and lid 105 of the package, forming a second electrode.

Connections between chip component bond pads 120, 125 and package bond pads 130, 135 may be made through a number of methods including wire bonding, flip-chip, conductive adhesive, capacitive coupling, and even through the use of a single conductive region in the case for which chip component 110 comprises a region of package base 115. Conductive surface 120 provides connectivity to a radio frequency (RF) ground. Optionally chip component 110 may provide a plurality of additional bond pads (not shown) connected to additional conductors on the surface supporting return contact 120 but potentially isolated from RF ground. The other electrode in lid 105 is operably coupled to transceiver 150 across gap 155 providing capacitive coupling to integrated coupling structure 105.

Embodiments of the approach of FIG. 1 offer simplicity and potentially maximize the coupling distance, but have two distinct attributes. One is that the use of a single-ended coupling strategy requires access to a common RF return connection. The RF return may be through physical connection to a ground plane, proximity to a ground plane or the like. It is also possible to operably connect to an equivalent RF ground or return that has no physical connectivity to the transceiver. For example, a sensor placed in contact or proximity to a high voltage transmission line is effectively connected to earth ground at RF due to the capacitive coupling of various surge protection equipment and the like. Similarly, a mechanical device may be sufficiently large and conductive as to behave identically to an RF ground, offering a capacitive connection to a common potential of sufficiently low impedance as to complete the circuit to the transceiver. These illustrative examples are meant to represent a much broader definition of an equivalent RF ground. Another is that the single capacitive plate may become an electrically large radiating structure at some higher frequency and therefore has some level of electromagnetic emissions that may be undesirable. Another embodiment is offered using balanced capacitive coupling.

Figure 2:
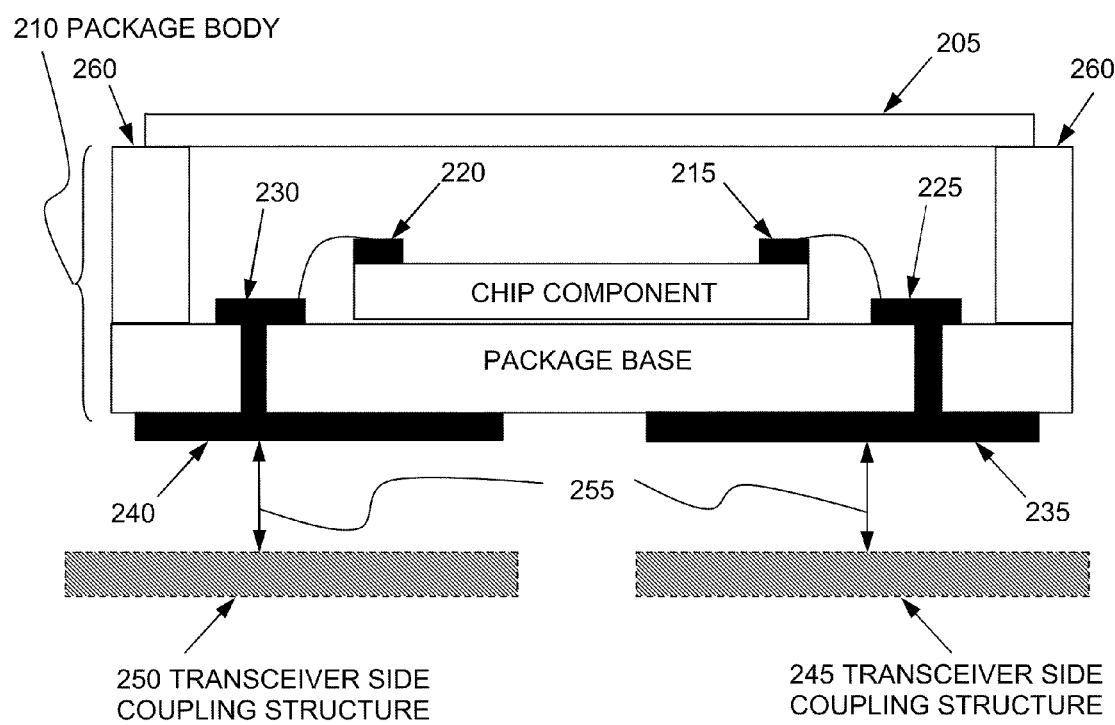
FIG. 2 is a simplified cross-section view of a parallel capacitor integrated package configured in accordance with one embodiment of the present invention.

FIG. 2 is a simplified perspective view of an embodiment of an integrated package 200 employing balanced coupling. In one variant offering simple construction, lid 205 on package body 210 is electrically nonfunctional but may be employed structurally to affix the component in a system. As before, bond pads 215 and 220 are operably connected to bond pads 225 and 230, which are then connected to conductive regions 235 and 240, said regions forming coplanar coupling structures. Capacitor plates 245 and 250 are coupled to the transceiver (not shown) and interface with sensor plate conductive regions 235 and 240 across gap 255 to form two adjacent, parallel plate capacitors. Variants where the plates are not parallel or even coplanar but that use capacitive coupling of both contacts are included as extensions of this embodiment.

The balanced reactive connection of FIG. 2 has an advantage of reduced electromagnetic emissions and therefore of simpler compliance with regulatory bodies as to the use of spectrum. It is possible to qualify as a non-radiating device or as an unintentional radiator. A limitation of this embodiment is that the desired connectivity is through two capacitors, each having half the area available to a single capacitor embodiment. This results in four times the series reactance. The effect is aggravated by the shunt capacitance formed between the coplanar transceiver electrodes or the coplanar sensor electrodes. It can thus be expected that, for a given transceiver signal to noise ratio, this balanced system embodiment will have shorter coupling range. This can be advantageous when multiple sensors are proximate, as shorter range will afford better selectivity to the more proximate sensor.

Figure 3:
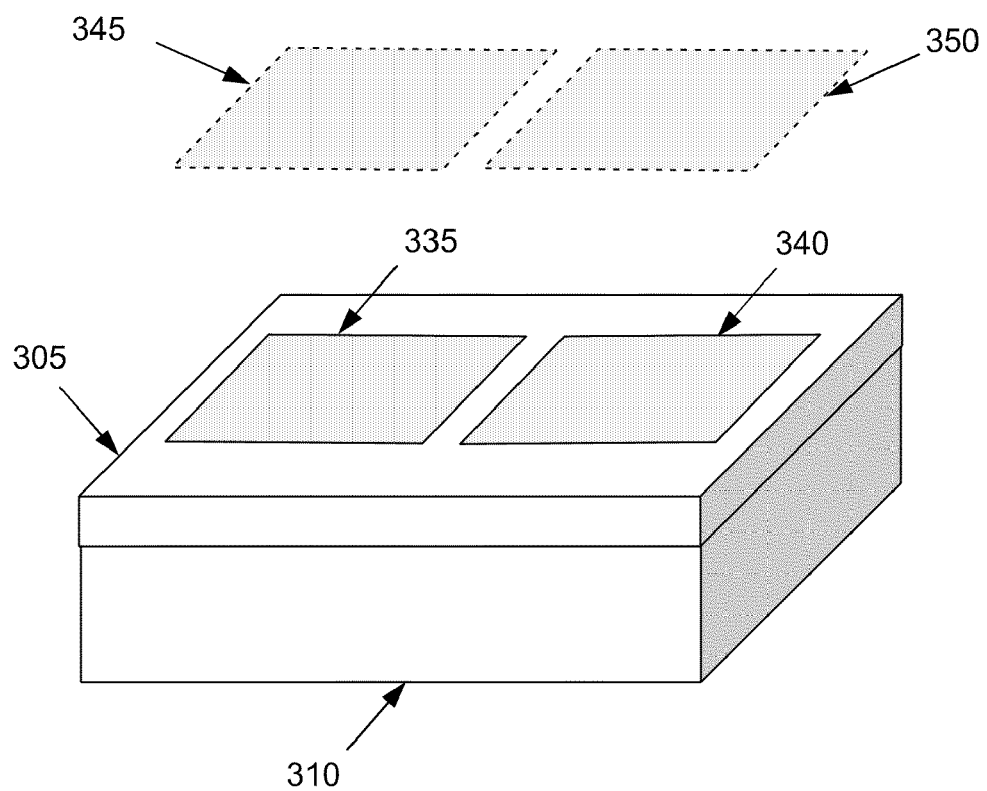
FIG. 3 is a simplified perspective view of a coplanar capacitor integrated package configured in accordance with one embodiment of the present invention.

An alternate embodiment in which both contacts are brought to the upper surface through the sidewalls 260 to two electrodes fabricated into the lid is considered functionally identical but is illustrated in FIG. 3.

FIG. 3 is a simplified perspective view of an embodiment of a coplanar capacitor integrated package 300. Here, lid 305 on package body 310 comprises coplanar capacitor plates 335 and 340. Capacitor plates 345 and 350 are coupled to transceiver (not shown) through a balanced transmission line and interface with sensor plates 335 and 340 across the intervening gap as described previously. Variants where the plates are not parallel are included as extensions of this embodiment.

Figure 4:
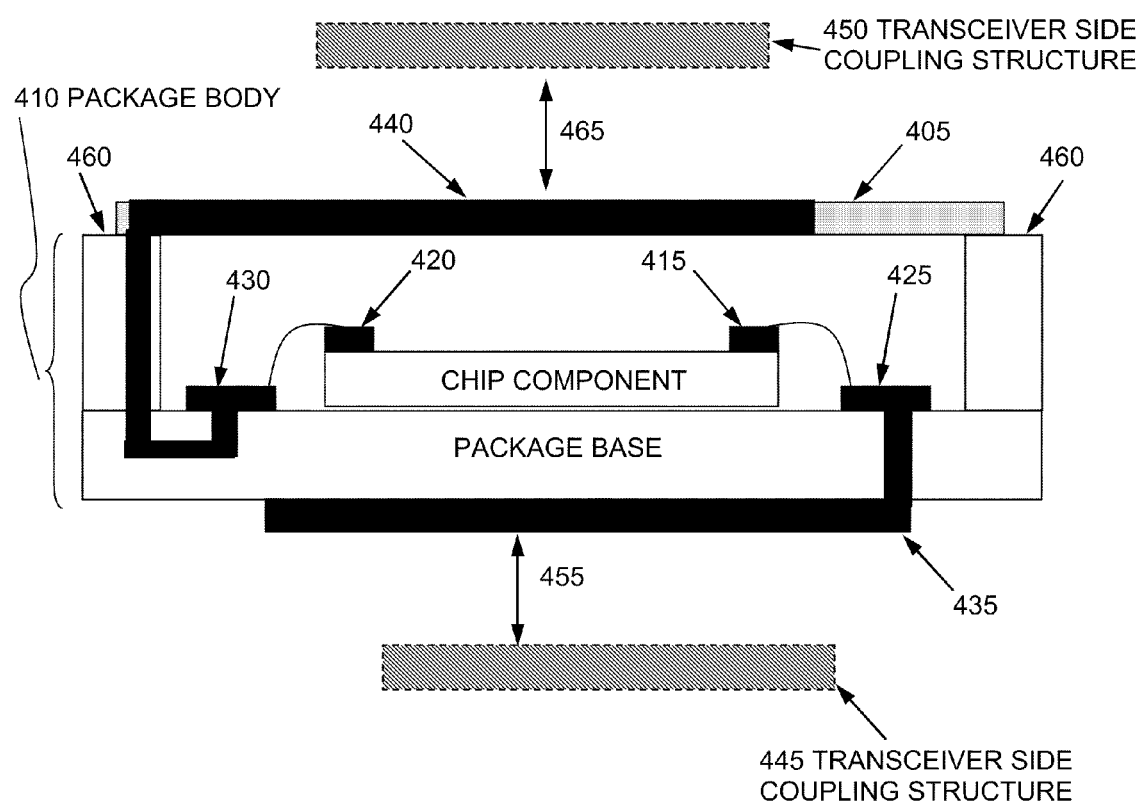
FIG. 4 is a simplified cross-section view of a dual capacitor integrated package configured in accordance with one embodiment of the present invention.

FIG. 4 is a simplified perspective view 400 of an embodiment of an integrated package example including placing one electrode 440 in lid 405 and the other electrode 435 in the package body. Lid 405 is on sidewalls 460 of package body 410. Bond pads 415 and 420 are operably connected to bond pads 425 and 430, which are then connected to conductive regions 435 and 440, said regions forming coupling structures. It is implicit that bond pads 415 and 420 are further operably connected to the terminals of a transducer structure of the AWD. Typically, for a surface generated acoustic wave (SGAW) device, the transducer would comprise an interdigital transducer whereas for a bulk-generated acoustic wave (BGAW) device, the transducer types are typically parallel plate or coplanar plate transducers. Other transducer types such as meander line Lorentz force transducers are also in embodiments. Capacitor plates 445 and 450 are coupled to transceiver (not shown) and interface with sensor plate conductive regions 435 and 440 across separation gaps 455 and 465, respectively, to form two parallel plate capacitors.

Capacitive coupling is but one form of near-field reactive coupling and the present invention also contemplates structures in which inductive coupling between current carrying loops integrated into the package is provided. In the figures that follow the loop or coil associated with the transceiver will not be explicitly shown.

Figure 5A:
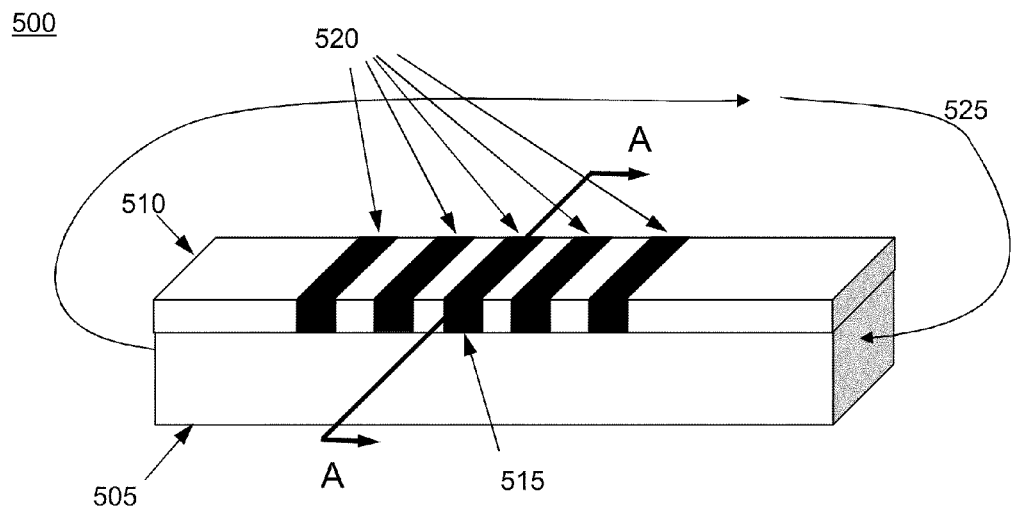
FIG. 5A is a simplified perspective view of a micro-strip loop integrated package configured in accordance with one embodiment of the present invention.

FIG. 5A is a simplified perspective view 500 of an embodiment of a micro-strip loop integrated package 500 having package body 505 with lid 510 comprising microstrip 515, which may be one of a plurality of such strips 520 as shown. In a particular embodiment, strips 515 and 520 are contained within the package and not exposed to the environment. 525 indicates magnetic flux lines. In one embodiment, said conductors form structures having lumped element properties reasonably equivalent to an inductor. In other embodiments, the structure is self resonant and forms a so-called helical resonator. Helical resonators result from the parallel resonance of the distributed inductance per loop and the distributed capacitance between adjacent loops. In yet another the conductors represent transmission limes and are sufficiently coupled to corresponding transmission lines of the transceiver structure as to provide a coupled transmission line structure.

Figure 5B:
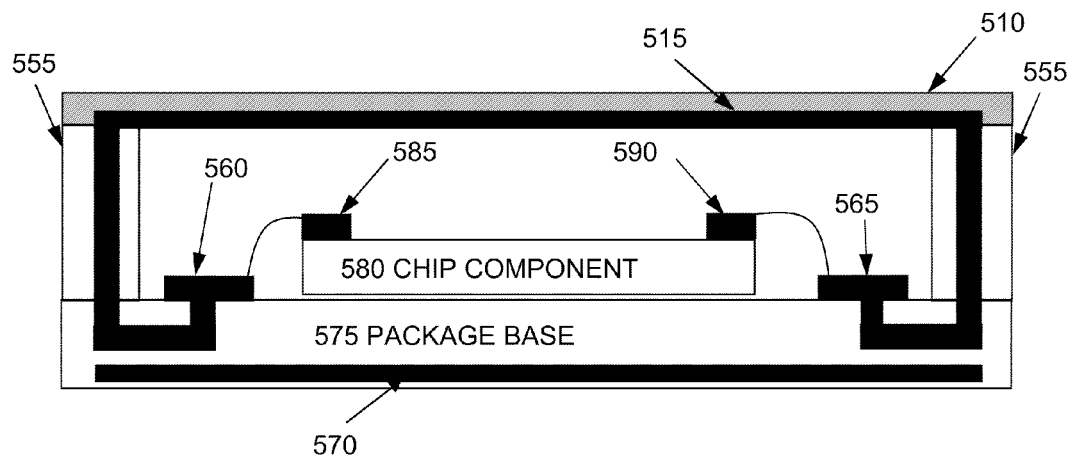
FIG. 5B is a simplified cross-section view of the micro-strip loop integrated package of FIG. 5A configured in accordance with one embodiment of the present invention.

FIG. 5B is a simplified section view 550 through A-A of the perspective view of FIG. 5A. Strips 520 of FIG. 5A are connected to form at least one circuit around the package wherein a first of said strips connects through the sides 555 of the package to bond pad 560 and the last of said strips connects to bond pad 565. In the case where a plurality of such strips exists, the first is connected to the second and so forth using corresponding strips 570 in the base 575. The system of loops thus indicated will couple to properly positioned fields of magnetic flux 525 as depicted in FIG. 5A. The system has the advantage of being a balanced connection requiring no return contact and of potentially being completely enclosed within the dielectric material of the package. As previously, chip component 580 bond pads 585 and 590 are operably connected to bond pads 560 and 565 which are connected as just described.

In certain embodiments, the inductance so formed and the AWD element's capacitance are parallel resonant at a desired frequency of the AWD resonance. The inductance is self resonant in another embodiment and exhibits an impedance sufficiently higher than the AWD impedance to minimize "load pull" effects.

Figure 6:
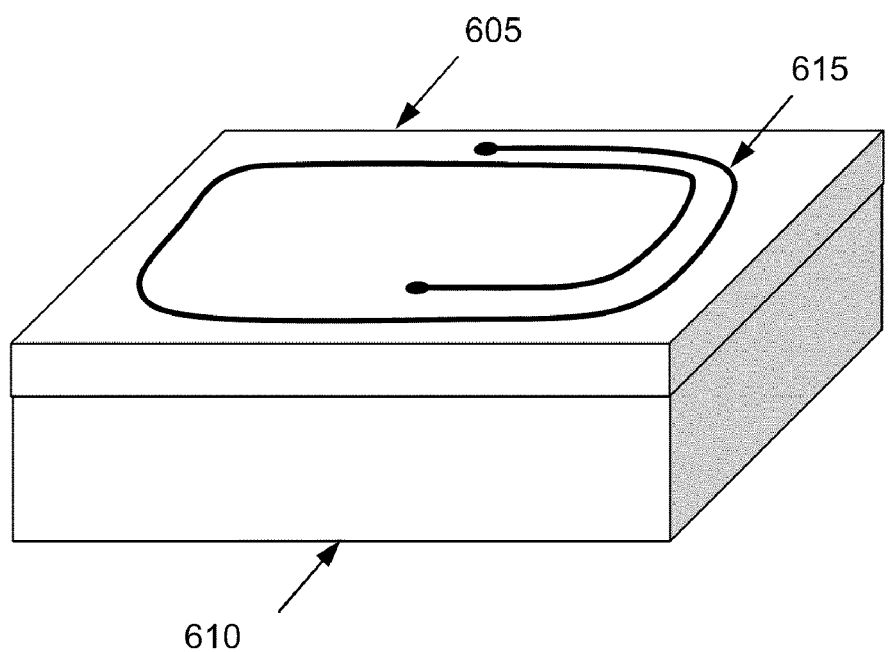
FIG. 6 is a simplified perspective view of a planar inductor integrated package configured in accordance with one embodiment of the present invention.

FIG. 6 is a simplified perspective view of an embodiment of a planar inductor integrated package 600. Lid 605 on package body 610 comprises inductive coil 615 formed to interact with applied magnetic fields from a proximate, second, coil of a transceiver (not shown). Package 610 includes an AWD chip component (not shown). In certain embodiments, coil 615's inductance and the AWD element's capacitance are parallel resonant at a desired frequency of the AWD resonance. Coil 615 is self resonant in another embodiment and exhibits an impedance sufficiently higher than the AWD impedance to minimize "load pull" effects. The planar inductor coupling structure being sufficiently proximate and aligned with a corresponding inductive coupling structure in the transceiver allows inductively coupled signal transfer therebetween. In embodiments wherein the AWD and parasitic capacitance of the coupling structure exhibit parallel resonance with the coil inductance, a coupled resonator circuit is formed therebetween. The case in which the coil is integrated into the package base 610 is equivalent and is not explicitly illustrated.

FIG. 7 is a simplified diagram of an embodiment of a wirelessly coupled integrated package sensor system 700. Integrated sensor 705 lies within medium 710 opposite transceiver 715 with partition 720 between sensor 705 and transceiver 715. Transceiver 715 is considered to incorporate at least one coupling structure providing coupling to the at least one coupling structure integrated into AWD sensor 705. This embodiment provides a mechanical relationship of coupling across an isolation barrier 720 to support operation in hazardous environments.

Figure 8:
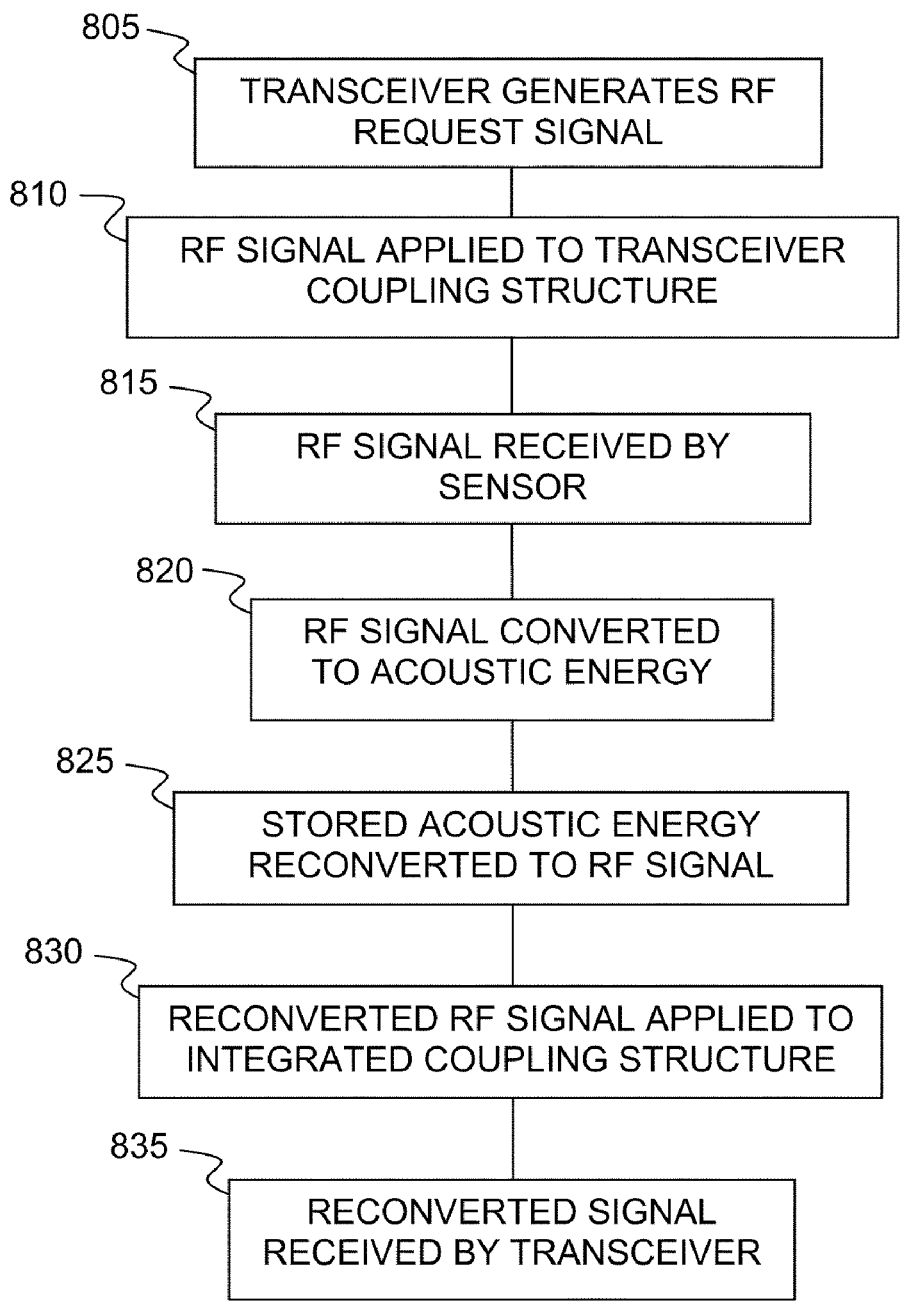
FIG. 8 is flow chart of the steps of a wireless interrogation method in accordance with one embodiment of the present invention.

FIG. 8 is a flow chart 800 of an embodiment of reactively-coupled wireless interrogation of a SAW sensor. The transceiver generates a radio frequency (RF) interrogation signal 805 which is applied to the transceiver coupling structure 810. It is coupled to the sensor coupling structure 815. The RF signal is converted into acoustic stored energy in the AWD chip by virtue of the piezoelectric effect in an appropriate transducer 820. The stored acoustic energy is reconverted into an RF signal by the transducer 825. This reconverted electromagnetic energy is applied to the integrated coupling structure within the sensor package 830 and coupled from the transceiver coupling structure back into the transceiver 835. The RF (interrogation) signal can be sent either as short pulses or as a time-limited, continuous wave burst.

Figure 9:
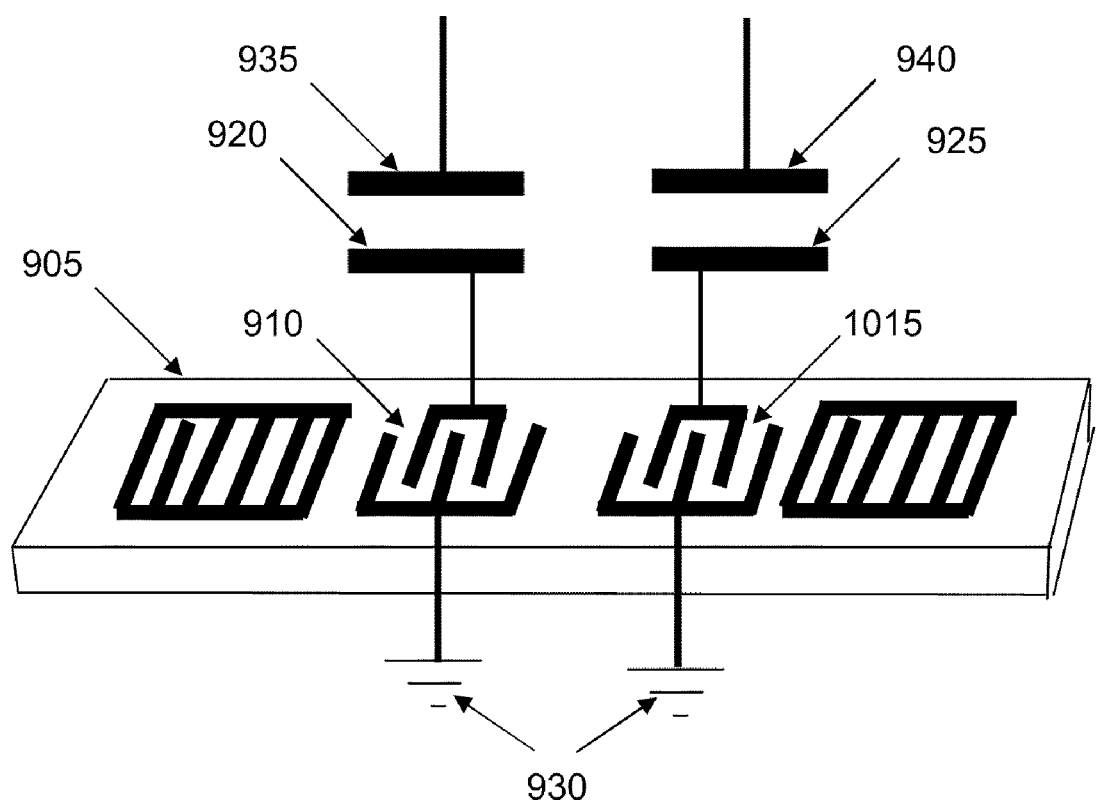
FIG. 9 is a simplified diagram of an embodiment having separate input and output connections with integrated near field coupling structures in accordance with the present invention.

FIG. 9 is an embodiment 900 having separate input and output connections with integrated near field coupling structures. In some cases it may be desired to couple an input signal into a two-port sensor and return the response signal through a separate port to a separate input of the transceiver. The concepts of the present invention are extensible to such cases and embodiments employ single ended connections as shown or balanced connections. Inductive two-port connections are also contemplated. In particular, the use of input and output coils such as solenoids oriented orthogonal to each other affords selectivity of the input and output coupling structures to the associated coupling structures of the transceiver. AWD sensor 905 comprises input transducer 910 and an output transducer 915 operably connected to coupling structures 920 and 921 integrated into the package. Return signal is shown as connected to earth ground 930, but may also be returned through one or more additional coupling structures or through the second connection to inductive coupling structures.

Transceiver coupling structures 935 and 940 are operably connected to circuitry within the transceiver and are reactively coupled to the corresponding sensor coupling structures. This two port sensor is enabled by the near field coupling of the present invention and is not generally operable with antennae and far field coupling. This two port sensor offers the ability to manufacture transceivers with extremely sensitive, low noise receivers that are not closely coupled to the high transmit signal levels, overcoming receiver side ringing that is problematic in "catch/throw" single antenna transceivers. It also provides for continuous interrogation and reception since the single coupling network and transducer are no longer sending and receiving signals.

FIG. 10 is a graph 1000 illustrating the relative coupling radii of reactive near field 1005, radiative near field 1010 and radiative far field 1015 coupling as a function of coupling structure size, normalized to the wavelength. For embodiments of the present invention, structures much smaller than $\lambda/4$ are desired to minimize radiation and restrict coupling to the reactive near field. The radius of the reactive near field is seen to be essentially independent of the coupling structure dimensions below this threshold. Common engineering practice is to establish a threshold of one order of magnitude smaller to be considered insignificantly small supporting a delineation of "electrically small" as $\lambda/10$. One embodiment employs a dimension of $\lambda/16$ for the maximum dimension.

In particular, it should be readily appreciated that the systems and methods disclosed herein may be practiced in conjunction with those of U.S. patent application Ser. No. 11/828,370, REFLECTIVE AND SLANTED ARRAY CHANNELIZED SENSOR ARRAYS, to convey the benefits of broadband and efficient coupling without contact to a multisensor integrated array.

It should be readily appreciated that the use of high breakdown voltage dielectric materials offing a high dielectric constant can allow an extension of the coupling range of the reactive near field as a result of their distortions of the electric fields of the coupling structure. In applications relating to sensing high voltages or applications in hazardous locations, a physical material barrier forming the separation between the transceiver and the sensor will simplify the approvals process for intrinsically safe apparatus.

It should be readily apparent that an AWD operably connected to an integrated coupling structure may be connected through direct wiring or may be coupled in such a way as to prevent damage from electrostatic discharge (ESD). In particular, employing a weakly conductive connection across the transducer of the AWD and low reactance capacitive coupling of said transducers to said coupling structures can improve the reliability of such sensors in high voltage and high-ESD environments. ESD power dissipative elements in embodiments include shunt resistive elements, semiconductor elements, and series capacitive elements.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for wirelessly communicating data, said system comprising:
    an acoustic wave device (AWD) sensor comprising:
    an AWD;
    a sensor package containing said AWD, and
    at least one coupling structure integrated with said sensor package,
        wherein said at least one integrated coupling structure is embedded in said sensor package, operatively coupled to said AWD sensor and
        wherein said at least one integrated coupling structure reactively couples with coupling structure of an adjacent transceiver across a separation.

2. The system of claim 1, wherein mutual coupling reactance is large compared to acoustic resistance of said AWD and wherein resistance of said transceiver is large compared to said acoustic resistance, minimizing load perturbations of resonant frequency of said AWD.

3. The system of claim 1, wherein mutual coupling reactance is small compared to acoustic resistance of said AWD and wherein resistance of said transceiver is large compared to said acoustic resistance, minimizing load perturbations of resonant frequency of said AWD.

4. The system of claim 1, wherein said package provides mechanical and electromagnetic isolation for operation in hazardous environments.

5. The system of claim 1, further comprising power dissipative elements providing electrostatic discharge (ESD) protection.

6. The system of claim 1, further comprising series capacitive elements providing electrostatic discharge (ESD) protection.

7. The system of claim 1, wherein said system operates between about approximately 200 MHz and about approximately 3 GHz.

8. The system of claim 1, wherein said at least one integrated coupling structure is at least one conductive region and said reactive coupling is capacitively-reactive coupling.

9. The system of claim 8, wherein said AWD further comprises an operative coupling to an equivalent RF ground.

10. The system of claim 8, wherein said at least one conductive region comprises at least two conductive regions.

11. The system of claim 8, wherein said AWD comprises a one port resonator.

12. The system of claim 8, wherein said AWD comprises a one port reflective delay line.

13. The system of claim 8, wherein said AWD comprises a two port resonator.

14. The system of claim 8, wherein said AWD comprises a reflective array compressor (RAC).

15. The system of claim 8, wherein said AWD comprises a device based on surface generated acoustic wave (SGAW) effects.

16. The system of claim 8, wherein said AWD comprises a device based on bulk generated acoustic wave (BGAW) effects.

17. The system of claim 8, wherein relationship of said position of said sensor with respect to said transceiver is stationary.

18. The system of claim 8, wherein relationship of said position of said sensor with respect to said transceiver comprises motion.

19. The system of claim 8, wherein said separation is less than the reactive near field distance.

20. The system of claim 8, wherein electrical length of said at least one coupling structure is smaller than about approximately $\lambda/10$.

21. The system of claim 8, wherein said sensor package is ceramic and comprises a lid, wherein said lid comprises said at least one coupling structure.

22. The system of claim 21, wherein said at least one coupling structure comprises a region of said lid of said ceramic package.

23. The system of claim 8, wherein said sensor package is ceramic and comprises a base, wherein said base comprises said at least one coupling structure.

24. The system of claim 23, wherein said at least one coupling structure comprises a region of said base of said ceramic package.

25. The system of claim 1, wherein said at least one integrated coupling structure comprises at least one conductive path and said reactive coupling is inductively-reactive coupling.

26. The system of claim 25, wherein said at least one conductive path is operatively connected to one pair of transducer connections of said AWD sensor.

27. The system of claim 25, wherein said at least one conductive path comprises at least two integrated coupling structures operatively coupled to two pairs of transducer connections on said AWD.

28. The system of claim 25, wherein said AWD comprises a one port resonator.

29. The system of claim 25, wherein said AWD comprises a one port reflective delay line.

30. The system of claim 25, wherein said AWD comprises a two port resonator.

31. The system of claim 25, wherein said AWD comprises a reflective array compressor (RAC).

32. The system of claim 25, wherein said conductive path comprises a planar, spiral inductor.

33. The system of claim 25, wherein said conductive path comprises a solenoidal inductor comprising at least one loop around periphery of said sensor package.

34. The system of claim 25, wherein said conductive path comprises a structure behaving as a lumped element inductor.

35. The system of claim 34, wherein said inductor is resonant with the natural input capacitance of said AWD.

36. The system of claim 34, wherein said inductor is self-resonant, approximating a helical resonator.

37. The system of claim 25, wherein said conductive path comprises a structure behaving as a transmission line having mutual impedance to said coupling structure in said transceiver.

38. The system of claim 25, wherein said AWD comprises a device based on surface generated acoustic wave (SGAW) effects.

39. The system of claim 25, wherein said AWD comprises a device based on bulk generated acoustic wave (BGAW) effects.

40. The system of claim 25, wherein said separation is less than the reactive near field distance.

41. The system of claim 25, wherein relationship of said position of said sensor with respect to said transceiver is stationary.

42. The system of claim 25, wherein relationship of said position of said sensor with respect to said transceiver comprises motion.

43. The system of claim 25, wherein electrical length of said at least one coupling structure is smaller than about approximately $\lambda/10$.

44. The system of claim 25, wherein said sensor package is ceramic and comprises a base, wherein said at least one integrated coupling structure comprises a pattern embedded into said base of said ceramic package.

45. A method for wirelessly sensing data comprising:
providing an acoustic wave device (AWD) sensor comprising: an AWD; a sensor package containing said AWD, and at least one coupling structure integrated with said sensor package, wherein said at least one integrated coupling structure is embedded in said sensor package, operatively coupled to said AWD sensor and wherein said at least one integrated coupling structure reactively couples with coupling structure of an adjacent transceiver across a separation; and
sensing said data from said AWD sensor.

46. A system for wirelessly communicating data, said system comprising:
an acoustic wave device (AWD) sensor comprising:
an AWD;
a ceramic sensor package containing said AWD, and
at least one coupling structure integrated into said sensor package,
wherein said at least one integrated coupling structure is embedded in lid of said sensor package, operatively coupled to said AWD sensor,
electrical length of said at least one coupling structure is smaller than about approximately $\lambda/16$, and
wherein said at least one integrated coupling structure capacitively-reactively couples with coupling structure of an adjacent transceiver across a separation.

* * * * *